United States Patent
He et al.

(10) Patent No.: US 12,349,199 B2
(45) Date of Patent: Jul. 1, 2025

(54) METHODS AND APPARATUS FOR TIME-DOMAIN PRACH RESOURCE DETERMINATION IN WIRELESS COMMUNICATION

(71) Applicant: Apple Inc., Cupertino, CA (US)

(72) Inventors: Hong He, Cupertino, CA (US); Chunxuan Ye, Cupertino, CA (US); Huaning Niu, Cupertino, CA (US); Jie Cui, Cupertino, CA (US); Dawei Zhang, Cupertino, CA (US); Haitong Sun, Cupertino, CA (US); Oghenekome Oteri, Cupertino, CA (US); Sigen Ye, Cupertino, CA (US); Wei Zeng, Cupertino, CA (US); Weidong Yang, Cupertino, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/598,038

(22) PCT Filed: Jan. 14, 2021

(86) PCT No.: PCT/CN2021/071946
§ 371 (c)(1),
(2) Date: Jul. 21, 2022

(87) PCT Pub. No.: WO2022/151288
PCT Pub. Date: Jul. 21, 2022

(65) Prior Publication Data
US 2023/0363003 A1    Nov. 9, 2023

(51) Int. Cl.
*H04W 74/0833*    (2024.01)

(52) U.S. Cl.
CPC ............. *H04W 74/0833* (2013.01)

(58) Field of Classification Search
None
See application file for complete search history.

(56) References Cited

U.S. PATENT DOCUMENTS

| 2019/0254078 A1 | 8/2019 | Zhang |
| 2019/0320467 A1 | 10/2019 | Freda et al. |

(Continued)

FOREIGN PATENT DOCUMENTS

| CN | 107889244 A | 4/2018 |
| CN | 111436132 A | 7/2020 |

(Continued)

OTHER PUBLICATIONS

International Preliminary Report on Patentability received for PCT Patent Application No. PCT/CN2021/071946, mailed on Jul. 27, 2023, 5 pages.

(Continued)

*Primary Examiner* — Anh Ngoc M Nguyen
(74) *Attorney, Agent, or Firm* — Kubota & Basol LLP

(57) ABSTRACT

Disclosed are methods and apparatus for determining time-domain PRACH resources in wireless communication. A New Radio (NR) Physical Random Access Channel (PRACH) configuration comprising an indication of a time-domain PRACH resource type to determine when the UE is allowed to transmit a PRACH preamble and a type of preamble format may be received. Additionally, a PRACH resource based on the received PRACH configuration to transmit the PRACH preamble, wherein the PRACH resource includes RACH resource occasions (ROs) with gaps in between may be determined. Thereafter, a PRACH procedure may be initiated by transmitting the PRACH preamble on a RO based on the determined PRACH resource to a base station (BS).

20 Claims, 13 Drawing Sheets

Window-based puncturing operation to create gap with improved resource efficiency.

(56) References Cited

U.S. PATENT DOCUMENTS

| | | |
|---|---|---|
| 2019/0387546 A1 | 12/2019 | Li et al. |
| 2020/0053772 A1 | 2/2020 | Pan et al. |
| 2021/0112596 A1 | 4/2021 | Hyun |
| 2021/0120581 A1 | 4/2021 | Kim |
| 2021/0337605 A1 | 10/2021 | Yuan et al. |
| 2022/0217783 A1* | 7/2022 | Liu .................. H04W 74/0833 |
| 2023/0143073 A1* | 5/2023 | Li ........................ H04L 5/1469 370/329 |

FOREIGN PATENT DOCUMENTS

| | | | |
|---|---|---|---|
| CN | 111788861 | A | 10/2020 |
| CN | 111972030 | A | 11/2020 |
| WO | 2020/154169 | A1 | 7/2020 |
| WO | 2020/197351 | A1 | 10/2020 |
| WO | 2020/227011 | A1 | 11/2020 |

OTHER PUBLICATIONS

International Search Report and Written Opinion received for PCT Patent Application No. PCT/CN2021/071946, mailed on Sep. 28, 2021, 6 pages.

Supplementary European Search Report and Search Opinion received for European Application No. 21918496.7, mailed on Jan. 30, 2024, 10 pages.

* cited by examiner

METHODS AND APPARATUS FOR TIME-DOMAIN PRACH RESOURCE DETERMINATION IN WIRELESS COMMUNICATION

RELATED APPLICATIONS

The present application is the national phase of International Application No. PCT/CN2021/071946, filed on Jan. 14, 2021 and the disclosure of which is hereby incorporated herein by reference in its entirety.

FIELD OF INVENTION

This invention relates generally to the field of wireless communication, and more particularly, to methods and apparatus for determining time-domain PRACH resources in wireless communication devices.

BACKGROUND OF THE INVENTION

A huge number of user devices utilizing high speed data rate to support high capacity related applications including Internet of Things (IoT) may benefit from a vast amount of bandwidth offered by the frequency spectrum beyond 52.6 Giga Hertz (GHz). Specifically, to efficiently utilize the frequency spectrum beyond 52.6 GHz operating frequency band to operate a New Radio (NR) system, an enhanced Physical Random Access Channel (PRACH) transmission may be required. With this enhanced PRACH transmission, an uplink resource utilization may be enhanced to facilitate various high capacity related applications.

Potential enhancement for PRACH transmission may include effort to investigate whether or not to support configurations that may enable non-consecutive RACH occasions (RO) in time domain to facilitate Listen-Before-Talk (LBT) processes if LBT is required. Additionally, it is noted that PRACH subcarrier spacing (SCS) selection may consider SCS of data/control channels and enablement of single subcarrier spacing operation. It is also identified that potential enhancements for PRACH may need to consider system coverage for PRACH with subcarrier spacing larger than 120 kHz, if supported.

NR specifications have been developed in Rel-15 and Rel-16 to define operations for operating frequencies up to 52.6 GHz. In these specifications, physical layer channels, signals, procedures, and protocols may be optimized for use with the operating frequencies under 52.6 GHz. Operations with operating frequencies up to 52.6 GHz may not be able to support the increasing demand of enhanced 5G communication technology requiring high speed data rate and low latency.

However, in Rel-15 or Rel-16, the PRACH RO within a PRACH slot may be consecutive. As a result, some PRACH RO may be blocked by an earlier transmission originating from other user equipment (UE). Thus, there is a need for an enhanced mechanism for an unlicensed operation with LBT requirement to enable gap-based PRACH resource allocation, thereby improving the PRACH resource utilization.

SUMMARY OF THE DESCRIPTION

Methods and systems to determine PRACH time-domain resource are disclosed. A baseband processor of a wireless user equipment (UE) configured to perform operations may include receiving a New Radio (NR) Physical Random Access Channel (PRACH) configuration comprising an indication of a time-domain PRACH resource type to determine when the UE is allowed to transmit a PRACH preamble and a type of preamble format. The operations may also include determining a PRACH resource based on the received PRACH configuration to transmit the PRACH preamble, wherein the PRACH resource includes RACH resource occasions (ROs) with gaps in between. Additionally, the operations may include initiating a PRACH procedure by transmitting the PRACH preamble on a RO based on the determined PRACH resource to a base station (BS).

In some embodiments, the operations may further include performing Listen-Before-Talk (LBT) operations during a gap before the RO to transmit the PRACH preamble prior to initiating the PRACH procedure.

In another disclosed embodiment, the operations may further include determining whether the PRACH resource include gaps or no gaps based on a global synchronization channel number (GSCN) value.

In one disclosed embodiment, the ROs may include an even RO or an odd RO or a combination thereof indicated by a system information block (SIB) and limited to a set of a subcarrier spacing (SCS) not supported by a legacy UE.

In an embodiment, the operations may further include puncturing the RO positioned between two consecutive even ROs within a PRACH slot comprising odd and even ROs.

In another embodiment, the RO may not be punctured and allowed to transmit the PRACH resource if a time distance between a last symbol of a last RO within the PRACH slot and a first symbol of the RO in a next PRACH slot is equal or greater than a sensing slot.

According to an embodiment of the present disclosure, the RO that may not be punctured may not block a subsequent RO in the next PRACH slot due to a gap created by one or more subsequent symbols in a current PRACH slot or the first one or more symbols in the next PRACH slot.

In an embodiment, the puncturing may be performed across consecutive PRACH slots within a window if the PRACH configuration having an odd number of the RO within the PRACH slot and a time distance between a last symbol of a last RO within the PRACH slot and a first symbol of the RO in a next PRACH slot is less than a sensing slot.

In yet another disclosed embodiment, a size of the window may be predefined in a specification. In one embodiment, the ROs may be numbered from zero from a first PRACH slot to a last PRACH slot within the window across a slot boundary.

In another disclosed embodiment, the operations may further include puncturing a last repeated sequence of a RO of long sequences within a PRACH slot according to a predefined parameter to create the gap for all short PRACH formats except C0. A last RO of long sequences within the PRACH slot may not be punctured.

In some embodiments, the predefined parameter of a punctured repetition may be varied based on the SCS of PRACH format. In one embodiment, the PRACH slot that may not be punctured may be used by a cell-edge UE to extend a PRACH coverage.

In a further disclosed embodiment, the operations may further include shifting a starting position of RO according to a predefined gap parameter to create a gap before the RO. Additionally, the operations may include shifting PRACH transmission OFDM symbol.

In another embodiment, the gap may include a predefined shift parameter and a cyclic prefix (CP) extension of a first PRACH transmission OFDM symbol allocated for the PRACH transmission. In one embodiment, the gap may be fixed in a specification based on the SCS. The predefined shift parameter may equal a sensing slot value.

According to another aspect, the above method can be implemented in a user equipment (UE) device including at least one antenna, at least one radio, and at least one processor coupled to the at least one radio. The at least one radio may be configured to communicate with a second UE of a communication network using the at least one antenna. The at least one processor may be configured to perform operations of the above method.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
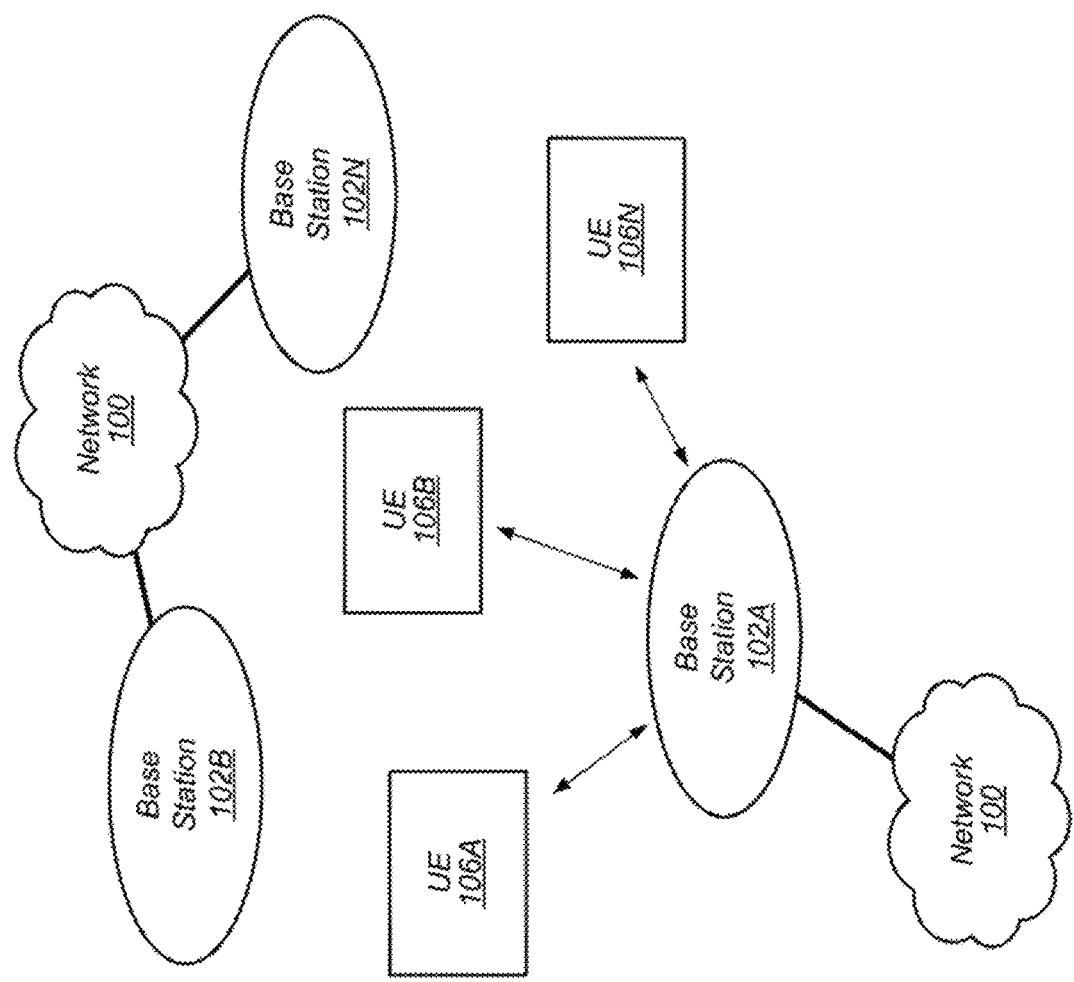
FIG. 1 illustrates an example wireless communication system according to one aspect of the disclosure.

Methods and apparatus for determining time-domain PRACH resource in wireless communication devices are disclosed. A gap-based PRACH resources may be configured for Rel-16/Rel-17 UEs and for a SCS supported by legacy UEs for PRACH transmission (e.g., 120 kHz on FR3). More especially, the gap-based PRACH resources may be used for Rel-17 UEs. The gap-based PRACH resource may be provided by different Information Elements (IEs) in System Information Block 1 (SIB1). In some embodiments, different non-overlapping Global Synchronization Channel Numbers (GSCNs) with certain gap may be defined to transmit SSB that can be used by the UE for system acquisition. Correspondingly, the legacy UE may not be able to access the network even if it may be operated with a SCS that may be supported by legacy UEs (e.g., 120 kHz SCS). In these embodiments, the new PRACH resource with gap can be used for Rel-17 UEs, thereby improving the PRACH resource utilization. SSB may be transmitted on a GSCN to allow legacy UEs accessing the band. Correspondingly, legacy PRACH resource without gap may be used. A different GSCN may be used to transmit SSB that conveys the gap-based PRACH resource configuration if legacy UEs may not be allowed on the frequency band.

In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" means that a particular feature, structure, or characteristic described in connection with the embodiment can be included in at least one embodiment of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

FIG. 1 illustrates a simplified example wireless communication system according to one aspect of the disclosure. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
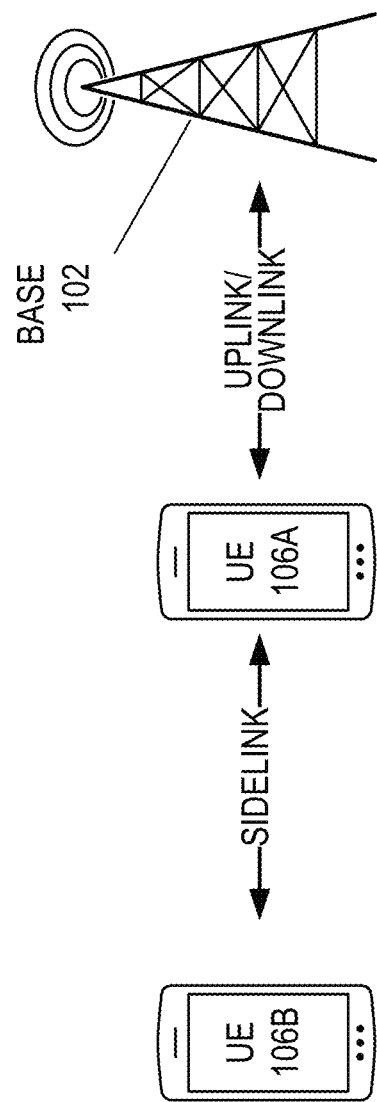
FIG. 2 illustrates user equipment 106A and 106B that can be in direct communication with each other (also known as device to device or sidelink) according to one aspect of the disclosure.

FIG. 2 illustrates user equipment 106A and 106B that can be in direct communication with each other (also known as device to device or sidelink). Sidelink communication can utilize dedicated sidelink channels and sidelink protocols to facilitate communication directly between devices. For example, physical sidelink control channel (PSCCH) can be used for actual data transmission between the devices, physical sidelink shared channel (PSSCH) can be used for conveying sidelink control information (SCI), physical sidelink feedback channel (PSFCH) can be used for HARQ feedback information, and physical sidelink broadcast channel (PSBCH) can be used for synchronization. Additional details are discussed in other sections.

In addition, sidelink communications can be used for communications between vehicles to vehicles (V2V), vehicle to infrastructure (V2I), vehicle to people (V2P), vehicle to network (V2N), and other types of direct communications.

UE 106A can also be in communication with a base station 102 in through uplink and downlink communications, according to some embodiments. The UEs may each be a device with cellular communication capability such as a mobile phone, a hand-held device, a computer or a tablet, or virtually any type of wireless device. The UEs 106A-B may include a processor that is configured to execute program instructions stored in memory. The UEs 106A-B may perform any of the method embodiments described herein by executing such stored instructions. Alternatively, or in addition, the UEs 106A-B may include a programmable hardware element such as an FPGA (field-programmable gate array) that is configured to perform any of the method embodiments described herein, or any portion of any of the method embodiments described herein.

The UEs 106A-B may include one or more antennas for communicating using one or more wireless communication protocols or technologies. In some embodiments, the UEs 106A-B may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UEs 106A-B may share one or more parts of a receive and/or transmit chain between multiple wireless communication technologies, such as those discussed above.

In some embodiments, the UEs 106A-B may include separate transmit and/or receive chains (e.g., including separate antennas and other radio components) for each wireless communication protocol with which it is configured to communicate. As a further possibility, the UEs 106A-B may include one or more radios which are shared between multiple wireless communication protocols, and one or more radios which are used exclusively by a single wireless communication protocol. For example, the UE 106A-B might include a shared radio for communicating using either of LTE or 5G NR (or LTE or 1×RTTor LTE or GSM), and separate radios for communicating using each of Wi-Fi and Bluetooth. Other configurations are also possible.

Figure 3:
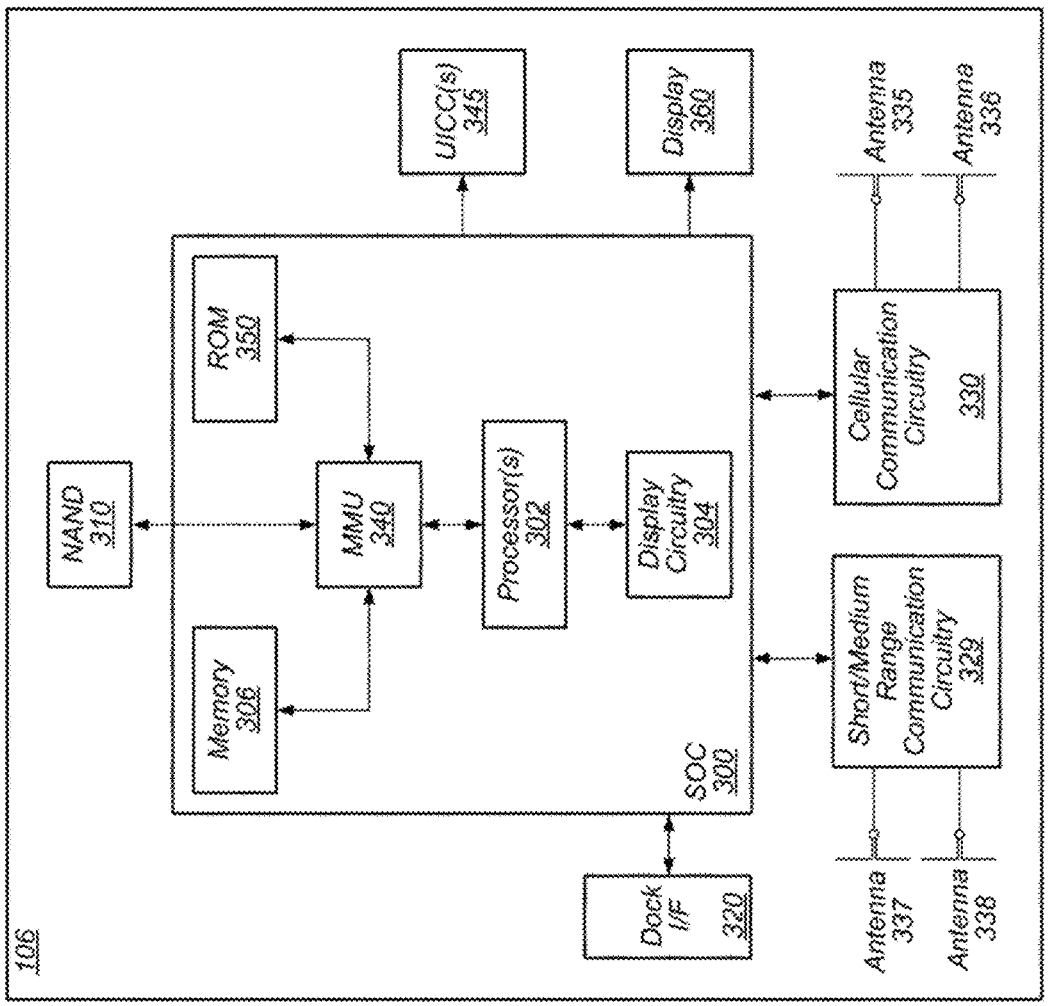
FIG. 3 illustrates an example block diagram of a UE according to one aspect of the disclosure.

FIG. 3 illustrates an example simplified block diagram of a communication device 106 according to one aspect of the disclosure. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple radio access technologies (RATs) (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may also be configured to determine a physical downlink shared channel scheduling resource for a user equipment device and a base station. Further, the communication device 106 may be configured to group and select CCs from the wireless link and determine a virtual CC from the group of selected CCs. The wireless device may also be configured to perform a physical downlink resource mapping based on an aggregate resource matching patterns of groups of CCs.

As described herein, the communication device 106 may include hardware and software components for implementing the above features for determining a physical downlink shared channel scheduling resource for a communications device 106 and a base station. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition), the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
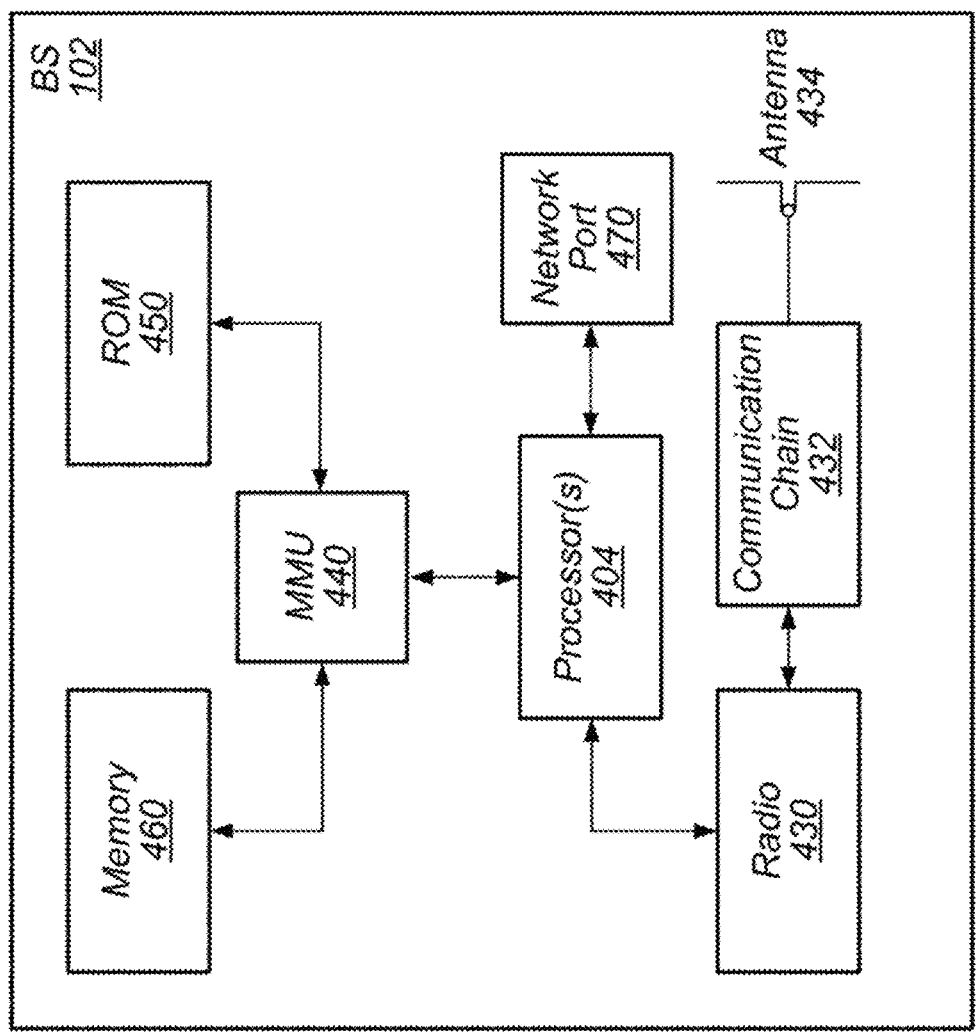
FIG. 4 illustrates an example block diagram of a BS according to one aspect of the disclosure.

FIG. 4 illustrates an example block diagram of a base station 102 according to one aspect of the disclosure. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition), the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
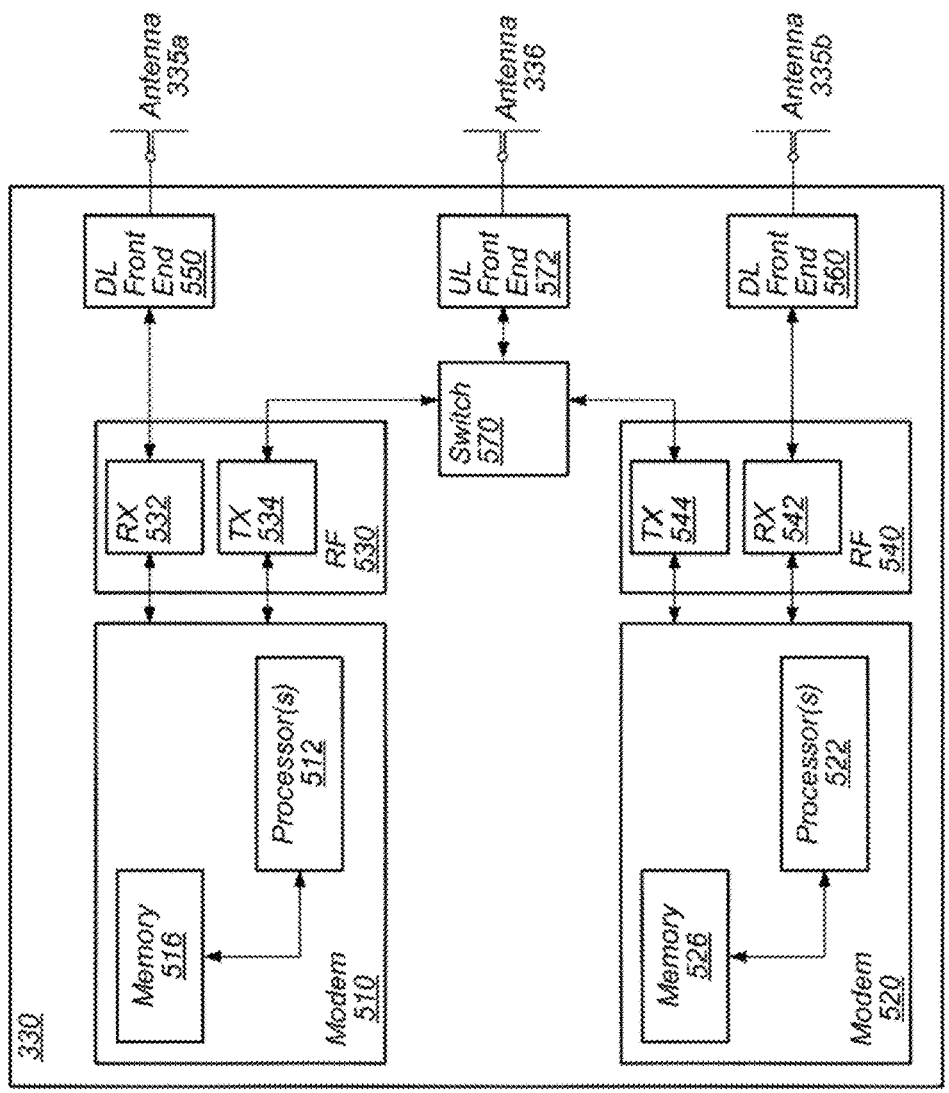
FIG. 5 illustrates an example block diagram of cellular communication circuitry according to one aspect of the disclosure.

FIG. 5 illustrates an example simplified block diagram of cellular communication circuitry according to one aspect of the disclosure. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 *a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for selecting a periodic resource part for a user equipment device and a base station, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition), the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for selecting a periodic resource on a wireless link between a UE and a base station, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition), the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
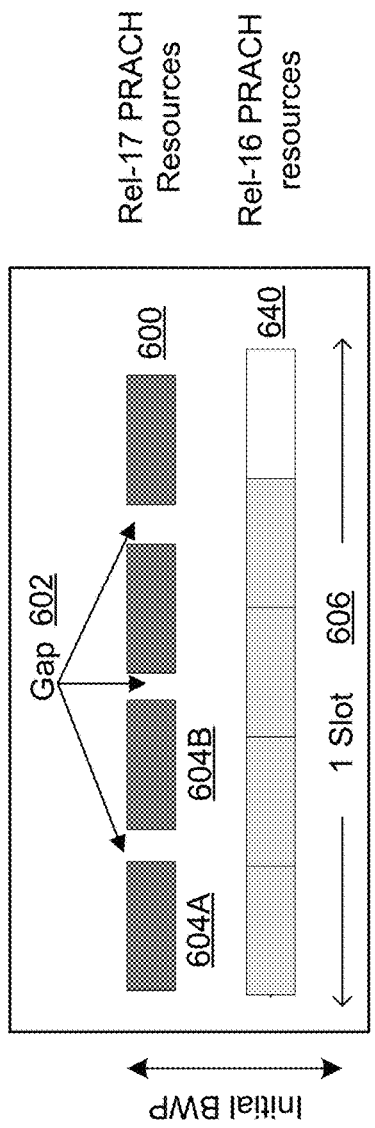
FIG. 6A depicts a PRACH resource for Rel-17 and Rel-16 according to one aspect of the disclosure.

FIG. 6A depicts an example of Rel-17 gap-based PRACH resource allocation 600 and Rel-16 no-gap PRACH resource allocation 640 according to the present disclosure. As shown in FIG. 6A, the gap-based PRACH resource allocation 600 can be used for Rel-17 UEs. One or more gaps 602 between two consecutive PRACH resource occasions (RO) (e.g., 604A and 604B) within a slot 606 may be created by puncturing a PRACH RO in between the two consecutive PRACH ROs (e.g., 604A and 604B). This gap-based PRACH resource allocation 600 may provide an enhanced mechanism for an unlicensed operation with LBT requirement to enable gap-based PRACH resource allocation, thereby improving the PRACH resource utilization.

In one embodiment, a baseband processor of a wireless equipment (UE) may be configured to perform operations including receiving a New Radio (NR) Physical Random Access Channel (PRACH) configuration comprising an indication of a time-domain PRACH resource type to determine when the UE is allowed to transmit a PRACH preamble and a type of preamble format. The operations may further include determining a PRACH resource based on the received PRACH configuration to transmit the PRACH preamble. The PRACH resource may include RACH resource occasions (ROs) with gaps in between. Additionally, the operations may include initiating a PRACH procedure by transmitting the PRACH preamble on a RO based on the determined PRACH resource to a base station (BS).

In one embodiment, the operations may further include performing Listen-Before-Talk (LBT) operations during a gap before the RO to transmit the PRACH preamble prior to initiating the PRACH procedure.

In another embodiment, the operations may further include determining whether the PRACH resource include gaps or no gaps based on a global synchronization channel number (GSCN) value. In some embodiments, for a frequency band, the GSCN values that may be associated with the gap-based PRACH resource allocation and the no-gap PRACH resource allocation may be separately defined and hard-encoded in the 3GPP specification TS 38.101 without the need of an explicit signaling to indicate these GSCN values. Instead, based on the GSCN where a UE detects the presence of a PRACH resource, UE can identify the resource type based on the relationship between the GSCN and PRACH resource type hard-encoded in the specification, i.e. gap-based or no-gap PRACH resource. The gap-based access may include the PRACH resources with one or more gaps for supporting Listen-Before-Talk (LBT) operations to accommodate a propagation delay between RACH occasions (ROs). Therefore, this gap-based PRACH resource allocation may provide an enhanced mechanism for an unlicensed operation with LBT requirement to enable gap-based PRACH resource allocation, thereby improving the PRACH resource utilization.

In one embodiment, Table 6.3.3.2-4 defined in 3GPP TS 38.211 (see https://www.sharetechnote.com/html/5G/5G_RACH.html#Table_6_3_3_2_4) may be reused to signal the PRACH time domain resources for a frequency band beyond 52.6 GHz (referred to 'FR3' hereinafter) by using prach-ConfigurationIndex. However, the PRACH RO configured by higher layers may be only transmitted in 'even' or 'odd' ROs of multiple ROs within a PRACH slot or a reference slot (e.g., 60 kHz subcarrier spacing (SCS) for FR3).

In some embodiments, the PRACH transmission using 'even' or 'odd' or 'both' ROs may be indicated by the higher layers (e.g., broadcasted system information block (SIB)) and limited to certain SCS sets based on the presence of legacy user equipment (UE) to avoid potential backward compatible problem. The ROs may include an even RO or an odd RO or a combination thereof or a combination thereof indicated by a SIB and limited to a set of a SCS not supported by a legacy UE.

In some embodiments, the selective PRACH resource may be limited to a set of SCS that may not be supported by legacy UEs for PRACH transmissions (e.g. 240/480/960 kHz SCS). For these SCS configurations, gNB may choose one of these configurations i.e. 'even' or 'odd' or both based on the requirement of LBT operation, latency performance target, as well as the number of UEs in a system with balancing between latency and resource efficiency.

Figure 6B:
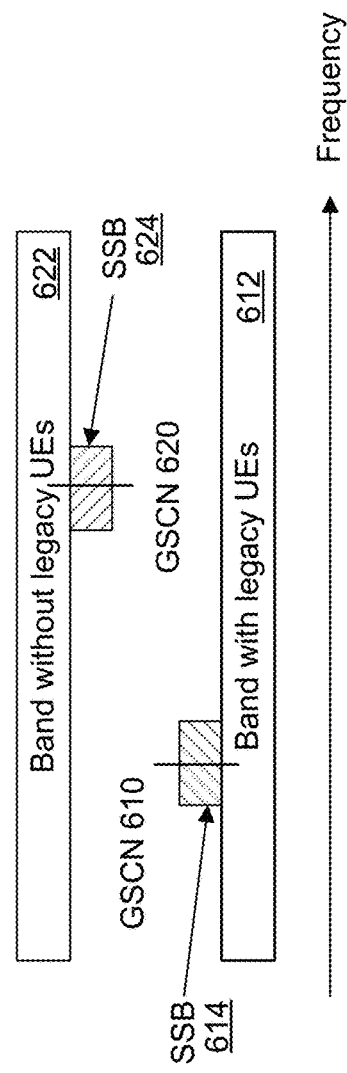
FIG. 6B depicts an example of using GSCN to control the access for legacy UE and PRACH resource configuration according to one aspect of the disclosure.

FIG. 6B depicts an example of using Global Synchronization Channel Number (GSCN) to control legacy UE access to a frequency band without legacy UE according to embodiments of the present disclosure. In some embodiments, different non-overlapping GSCN with certain gaps may be defined to transmit SSB that can be used by the UE for system acquisition. Correspondingly, the legacy UE may not be able to access the network even though it may be operated with a SCS (e.g., 120 kHz SCS) that may be supported by the legacy UEs. In these embodiments, the gap-based PRACH resource allocations can be used for Rel-17 UEs. As shown in FIG. 6B, SSB 614 may be transmitted on the GSCN 610 to allow legacy UEs accessing the band 612. Correspondingly, the legacy no-gap PRACH resource allocation (e.g., 640 in FIG. 6A) may be used. On the other hand, GSCN 620 may be used to transmit SSB 624 that may convey the gap-based PRACH resource configuration if legacy UEs are intended to be banned on the frequency band by operator.

In an embodiment, the operations may further include puncturing the RO positioned between two consecutive even ROs within a PRACH slot comprising odd and even ROs.

Figure 7:
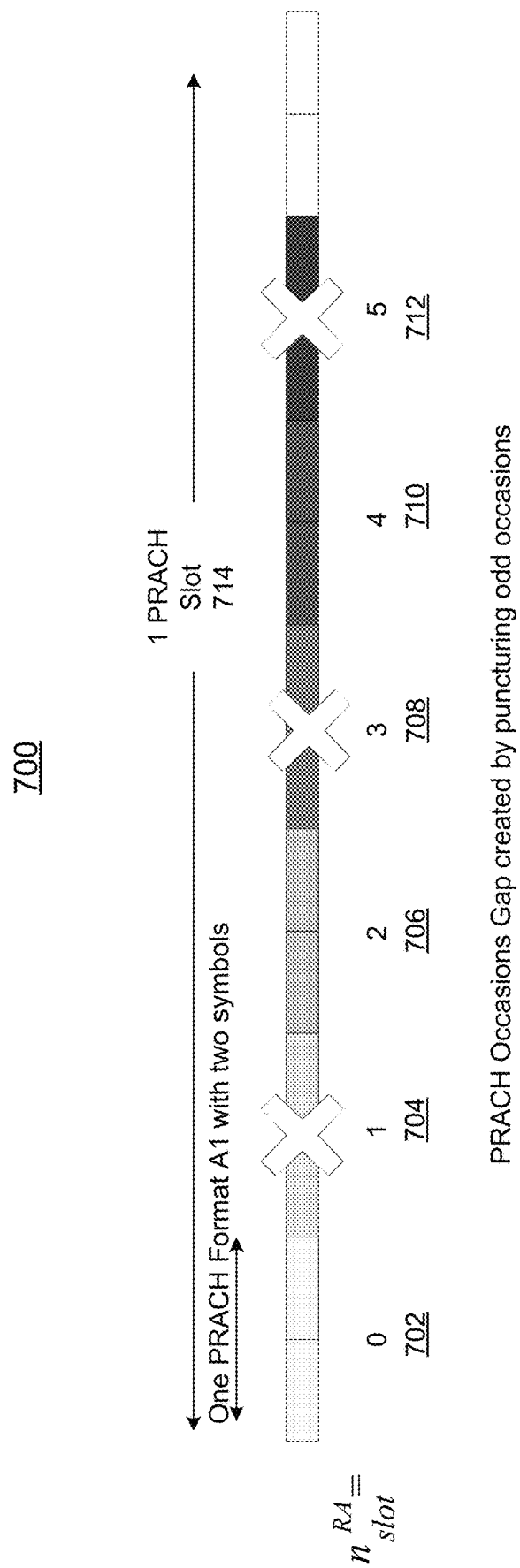
FIG. 7 depicts PRACH occasions gap created by puncturing odd occasions according to one aspect of the disclosure.

FIG. 7 depicts an example of even PRACH occasions 700 assuming prach-Configuration Index=1. As shown, six time-domain PRACH resources (702, 704, 706, 708, 710, and 712) may be used within a PRACH slot 714. Even PRACH occasions may be configured by puncturing odd ROs. In one embodiment, a gap between two even consecutive PRACH resources #0 702 and #2 706 may be created by puncturing PRACH RO in between. In this embodiment, PRACH RO #1 704 may be punctured to create the gap. Similarly, PRACH RO #3 708 may be punctured to create a gap between two even consecutive PRACH resources #2 706 and #4 710. With this 'Even-Odd' puncturing mechanism, PRACH resource efficiency may be enhanced by mitigating the blocking problem of 'back-to-back' PRACH transmissions in an existing NR system (e.g., transmitting PRACH on occasion 702 possibly blocks PRACH transmission in the subsequent occasion 704 if RACH Occasion 704 is allowed for UE to transmit PRACH). This gap-based PRACH resource allocation may provide an enhanced mechanism for an unlicensed operation with LBT requirement to enable gap-based PRACH resource allocation, thereby improving the PRACH resource utilization.

In some embodiments, if $\Delta \geq T_{sl}$ the PRACH RO may not be punctured and allowed to transmit; where $\Delta$ may represent the time distance between the last symbol of last PRACH resource in a slot and the first symbol of PRACH occasion in the next slot and $T_{sl}$ may represent the basic unit for sensing (i.e. sensing slot) for FR3.

According to an embodiment of the present disclosure, the RO that is not punctured does not block a subsequent RO in the next PRACH slot due to a gap created by one or more subsequent symbols in a current PRACH slot or the first one or more symbols in the next PRACH slot.

Figure 8:
FIG. 8 depicts PRACH occasions gap created by puncturing even-odd occasions according to one aspect of the disclosure.

FIG. 8 illustrates an example of an even-odd puncturing mechanism 800 according to some embodiments of the present disclosure. As shown, the PRACH RO #5 816 in a PRACH slot 802 may not be punctured because the PRACH RO #5 816 may not block the subsequent PRACH occasion #0 in a next PRACH slot 804 due to the presence of 2-symbol (e.g., 818 and 820) guard period (GP) after the PRACH RO #5.

Figure 9:
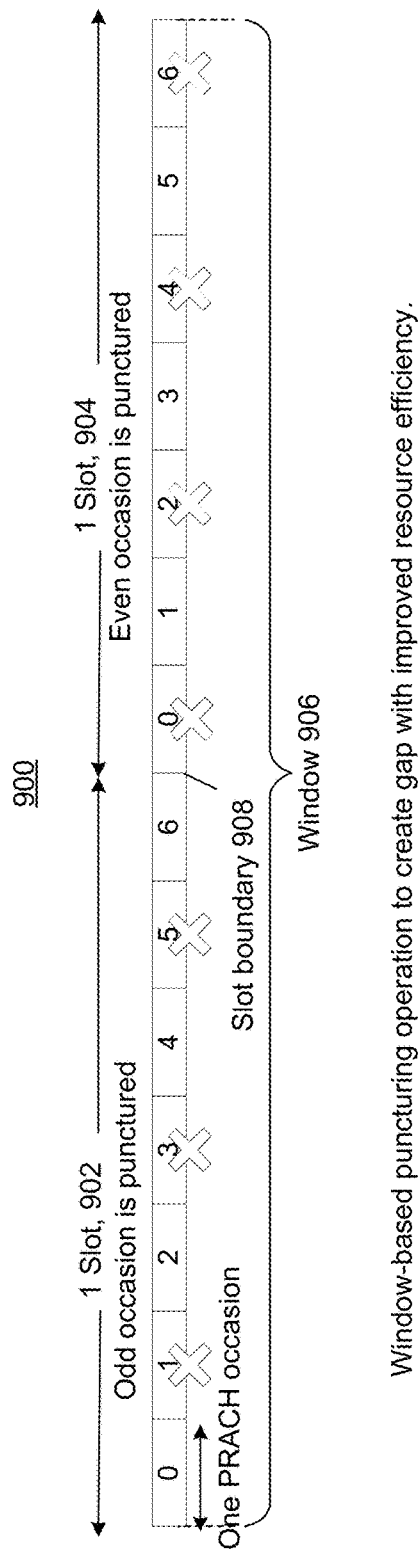
FIG. 9 depicts PRACH occasions gap created by window-based puncturing operation according to one aspect of the disclosure.

In an embodiment, the puncturing may be performed across consecutive PRACH slots within a window if the PRACH configuration having an odd number of the RO within the PRACH slot and a time distance between a last symbol of a last RO within the PRACH slot and a first symbol of the RO in a next PRACH slot is less than a sensing slot. As illustrated in FIG. 9, for PRACH configurations having an odd number of PRACH occasions (RO) (e.g., 3 or 7) within a PRACH slot (e.g., 902 and 904) and $\Delta < T_{sl}$ (e.g., configuration 144~155 for PRACH Format C0), 'Even-Odd' puncturing mechanism may be performed across consecutive slots (e.g., 902 and 904) within a pre-defined window 906 to improve the resource efficiency and avoid unnecessary puncturing. FIG. 9 illustrates one example of window-based puncturing pattern 900 to create a time-domain gap. As shown, the predefined window 906 size 'N' may be fixed in the specification (e.g., N=2).

As further illustrated in FIG. 9, the RACH occasions (RO) are numbered starting at 0 from the first PRACH slot 902 to the last PRACH slot 904 within the predefined window 906 across the slot boundary 908 for the purpose of puncturing operations. The PRACH RO with an even or an odd index may be punctured to create the time-domain gap for PRACH transmission. As shown, PRACH RO with an odd index (e.g., 1, 3, and 5) in slot 902 may be punctured. In the next slot 904 within the predefined window 906, PRACH RO with an even index (e.g., 0, 2, 4, and 6) in slot 904 may be punctured.

In another disclosed embodiment, the operations may further include puncturing a last repeated sequence of a RACH Occasion (RO) of long sequences within a PRACH slot according to a predefined parameter to create the gap for all short PRACH formats except C0. A last RO of long sequences within the PRACH slot may not be punctured.

Figure 10:
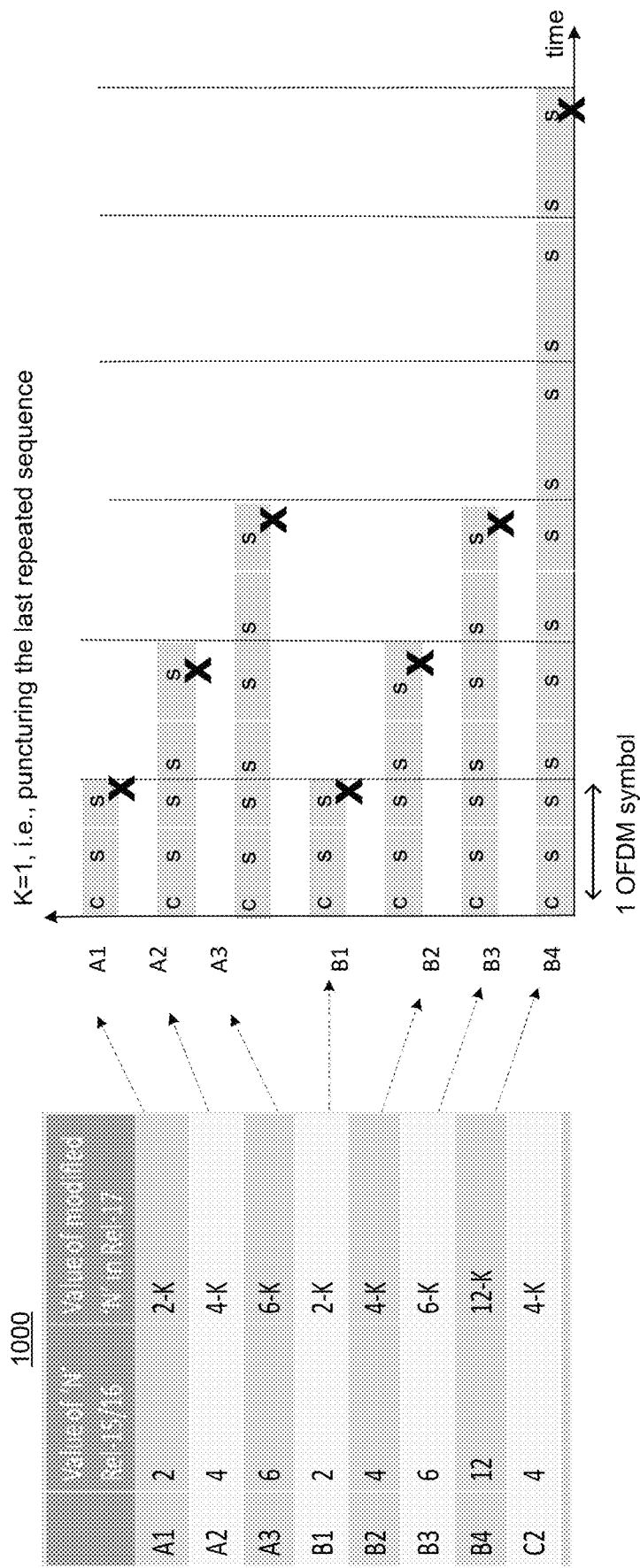
FIG. 10 depicts a table describing shortened PRACH format by puncturing the last K repetition and a corresponding random access preamble transmission according to one aspect of the disclosure.

According to certain embodiments of the present disclosure, the last 'K' repeated sequence may be punctured to create gap T1 gap duration for PRACH formats with sequence repetition i.e. $N=N_u/(2048*64*2^{(-u)})>1$, i.e. for all short PRACH formats except C0. FIG. 10 depicts an example of a table 1000 of the modified PRACH formats with shortened repetition. The value of the modified N in Rel-17 may depend on K. For example, for format A1, the value of the modified N in Rel-17 may be defined as 2–K. In contrast, the value of N for legacy Rel-15/16 for format A1 may be defined as 2.

In some embodiments, the predefined parameter of a punctured repetition may be varied based on the SCS of PRACH format. In one embodiment, the PRACH slot that may not be punctured may be used by a cell-edge UE to extend a PRACH coverage. In these embodiments, the number 'K' of punctured repetition may be varied according to the SCS of PRACH format to create a fixed $T_{sl}$ gap duration. As further illustrated in FIG. 10, the value of K may be defined as 1 for a preamble transmission. That means, the last repeated sequence in an OFDM symbol may be punctured. For example, the last repeated sequence may be punctured for format A1.

Figure 11:
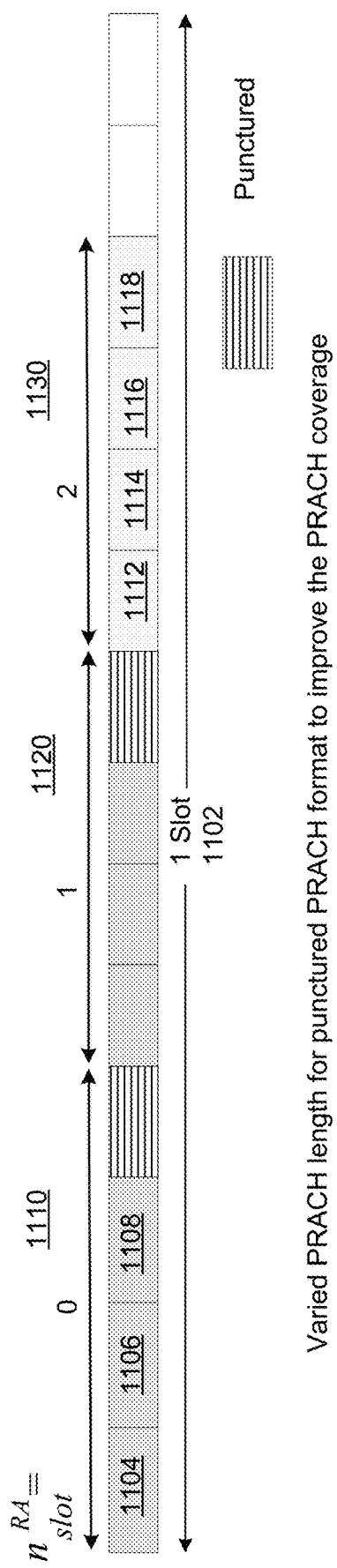
FIG. 11 depicts varied PRACH length for punctured PRACH format according to one aspect of the disclosure.

In some other embodiments, the last PRACH occasion (RO) in a PRACH slot may not be punctured, which can be leveraged by cell-edge UEs so as to reach the gNB during initial access procedure. Referring to FIG. 11, the PRACH occasions (RO) 1110 or 1120 of format A2 in a slot 1102 may include three repeated sequences (e.g., 1104, 1106, and 1108). There may be four repeated sequences (e.g., 1112, 1114, 1116, and 1118) for the last B2 format 1130 in the slot 1102 without puncturing operation, which can be used by cell-edge UE to extend the PRACH coverage.

In a further disclosed embodiment, the operations may further include shifting a starting position of PRACH occasion (RO) according to a predefined gap parameter to create a gap before the RO. Additionally, the operations may include shifting PRACH transmission OFDM symbol.

According to certain embodiments of this disclosure, the starting position $t_{start,l}^{RA}$ of the PRACH preamble may be given by the below equation.

$$t_{start,l}^{\mu} = \begin{cases} 0 & l = 0 \\ t_{start,l-1}^{\mu} + \left(N_u^{\mu} + N_{CP,l-1}^{\mu} + n_t^{RA} * \Delta\right) * T_c & \text{Otherwise} \end{cases}$$

$$l = l_0 + n_t^{RA}\left(N_{dur}^{RA} + 1\right) + 14n_{slot}^{RA}$$

where $N_u^{\mu}$ and $N_{cp,l-1}^{\mu}$ are defined in Rel-15/16, representing the duration of one OFDM symbol and the corresponding CP; $l_0$ is given by the parameter 'starting symbol' in a Table 'X'; $n_t^{RA}$ is the PRACH transmission occasion within the PRACH slot, numbered in an increasing order from 0 to $N_t^{RA,slot}$ where $N_t^{RA,slot}$ may be fixed in the Table X for FR3; and $n_{slot}^{RA}$ is given by the Table 'X' as well for FR3.

In the above equation, a new parameter Δ 1202 (see FIG. 12) may be added to create the required guard period before the transmission occasion by a cyclic prefix (CP) extension of the first OFDM symbol 1 allocated for PRACH transmission. In some embodiments, the $\Delta=T_{sl}$, e.g. $5*10^{-6}$.

In another embodiment, the gap may include a predefined shift parameter and a cyclic prefix (CP) extension of a first PRACH transmission OFDM symbol allocated for the PRACH transmission. In one embodiment, the gap may be fixed in a specification based on the SCS. The predefined shift parameter may equal a sensing slot value.

Figure 12:
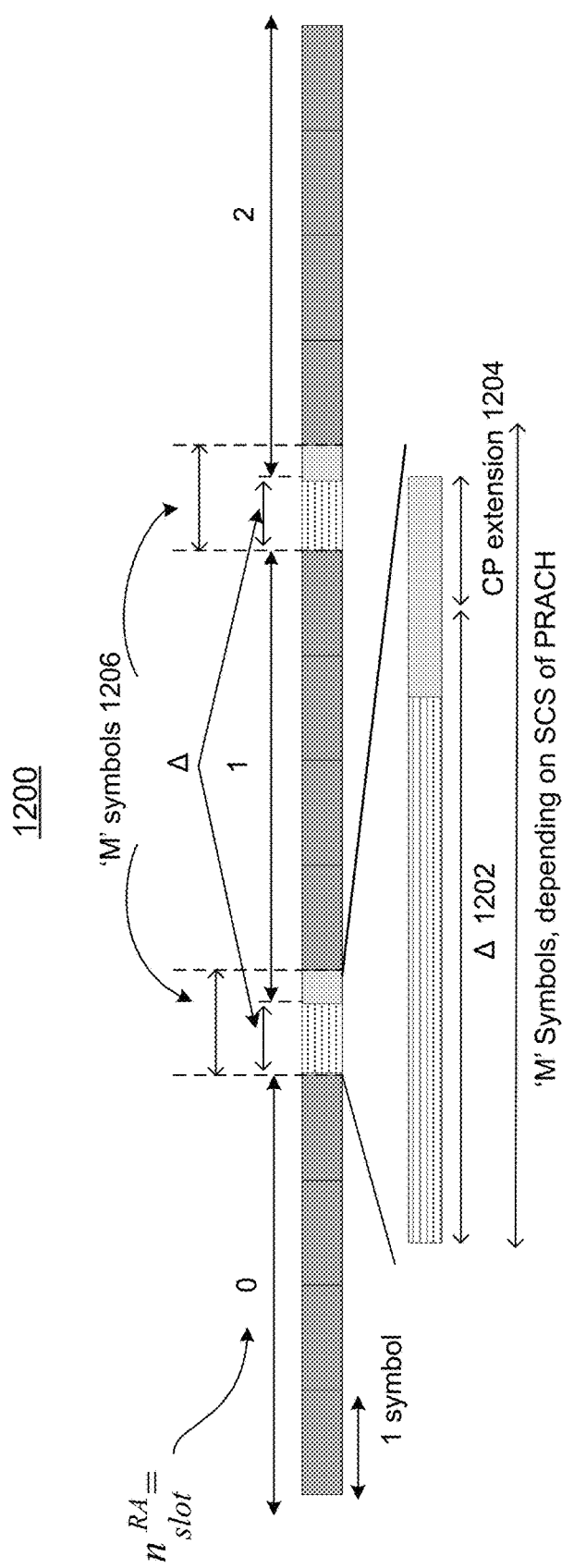
FIG. 12 depicts partial symbol puncturing with time-shifting to create a gap according to one aspect of the disclosure.

FIG. 12 illustrates an example of PRACH format time-domain signal generation 1200 based on the new parameter Δ 1202 together with the CP extension 1204. The 'M' value 1206 may be fixed in the specification based on SCS to generate the required gap value Δ.

Figure 13:
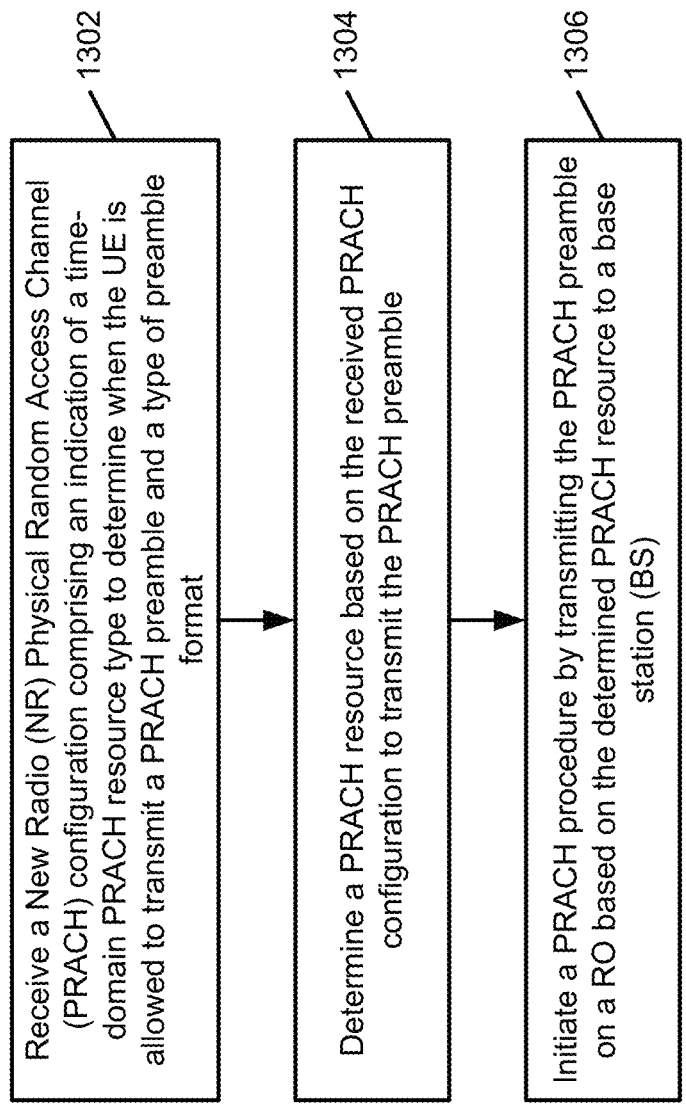
FIG. 13 depicts a flow diagram of a method for determining time-domain PRACH resources in wireless communication devices according to one aspect of the disclosure.

FIG. 13 is a flow diagram illustrating a method 1300 for determining time-domain PRACH resources in wireless communication devices, according to some embodiments. Process 1300 may be performed by processing logic which may include software, hardware, or a combination thereof. Referring to FIG. 13, in operation 1302, a UE may receive a New Radio (NR) Physical Random Access Channel (PRACH) configuration comprising an indication of a time-domain PRACH resource type to determine when the UE is allowed to transmit a PRACH preamble and a type of preamble format.

In operation 1304, the UE may determine a PRACH resource based on the received PRACH configuration to transmit the PRACH preamble. The PRACH resource may include RACH resource occasions (ROs) with gaps in between.

In operation 1306, the UE may initiate a PRACH procedure by transmitting the PRACH preamble on a RO based on the determined PRACH resource to a base station (BS). This gap-based PRACH resource allocation may provide an enhanced mechanism for an unlicensed operation with LBT requirement to enable gap-based PRACH resource allocation, thereby improving the PRACH resource utilization.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "determining," "receiving," "forming," "grouping," "aggregating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A baseband processor of a wireless user equipment (UE) configured to perform operations comprising:
   receiving a New Radio (NR) Physical Random Access Channel (PRACH) configuration comprising an indication of a time-domain PRACH resource type to determine when the UE is allowed to transmit a PRACH preamble and a type of preamble format;
   determining a PRACH resource based on the received NR PRACH configuration to transmit the PRACH preamble, wherein the PRACH resource includes RACH resource occasions (ROs) with gaps in between;
   initiating a PRACH procedure by transmitting the PRACH preamble on a RO based on the determined PRACH resource to a base station (BS); and
   performing Listen-Before-Talk (LBT) operations during a gap before the RO to transmit the PRACH preamble prior to initiating the PRACH procedure.

2. The baseband processor of claim 1, wherein the operations further comprise:
   determining whether the PRACH resource include gaps or no gaps based on a global synchronization channel number (GSCN) value.

3. The baseband processor of claim 1, wherein the ROs comprise an even RO or an odd RO or a combination thereof indicated by a system information block (SIB) and limited to a set of a subcarrier spacing (SCS) not supported by a legacy UE.

4. The baseband processor of claim 1, wherein the operations further comprise:
   puncturing the RO positioned between two consecutive even ROs within a PRACH slot comprising odd and even ROs.

5. The baseband processor of claim 4, wherein the RO is not punctured and allowed to transmit the PRACH resource if a time distance between a last symbol of a last RO within the PRACH slot and a first symbol of the RO in a next PRACH slot is equal or greater than a sensing slot.

6. The baseband processor of claim 5, wherein the RO that is not punctured does not block a subsequent RO in the next PRACH slot due to a gap created by one or more subsequent symbols in a current PRACH slot or the first one or more symbols in the next PRACH slot.

7. The baseband processor of claim 4, wherein the puncturing is performed across consecutive PRACH slots within a window if the NR PRACH configuration having an odd number of the RO within the PRACH slot and a time distance between a last symbol of a last RO within the PRACH slot and a first symbol of the RO in a next PRACH slot is less than a sensing slot.

8. The baseband processor of claim 7, wherein a size of the window is predefined in a specification.

9. The baseband processor of claim 7, wherein the ROs are numbered from zero from a first PRACH slot to a last PRACH slot within the window across a slot boundary.

10. The baseband processor of claim 1, wherein the operations further comprise:
   puncturing a last repeated sequence of a RO of long sequences within a PRACH slot according to a predefined parameter to create the gap for all short PRACH formats except C0.

11. The baseband processor of claim 10, wherein a last RO of long sequences within the PRACH slot is not punctured.

12. The baseband processor of claim 11, wherein the PRACH slot that is not punctured is used by a cell-edge UE to extend a PRACH coverage.

13. The baseband processor of claim 10, wherein the predefined parameter of a punctured repetition is varied based on a subcarrier spacing (SCS) of a PRACH format.

14. The baseband processor of claim 1, wherein the operations further comprise:
   shifting a starting position of the RO according to a predefined gap parameter to create a gap before the RO; and
   shifting a PRACH transmission OFDM symbol.

15. The baseband processor of claim 14, wherein the gap comprises a predefined shift parameter and a cyclic prefix (CP) extension of a first PRACH transmission OFDM symbol allocated for the PRACH transmission.

16. The baseband processor of claim 14, wherein the gap is fixed in a specification based on a subcarrier spacing (SCS).

17. The baseband processor of claim 15, wherein the predefined shift parameter equals a sensing slot value.

18. A method of communication by a wireless user equipment (UE) in a communication network, the method comprising:
   receiving a New Radio (NR) Physical Random Access Channel (PRACH) configuration comprising an indication of a time-domain PRACH resource type to determine when the UE is allowed to transmit a PRACH preamble and a type of preamble format; and
   determining a PRACH resource based on the received NR PRACH configuration to transmit the PRACH preamble, wherein the PRACH resource includes RACH resource occasions (ROs) with gaps in between;
   initiating a PRACH procedure by transmitting the PRACH preamble on a RO based on the determined PRACH resource to a base station (BS); and
   performing Listen-Before-Talk (LBT) operations during a gap before the RO to transmit the PRACH preamble prior to initiating the PRACH procedure.

19. A user equipment (UE) device comprising:
   at least one antenna;
   at least one radio, wherein the at least one radio is configured to communicate with a second UE device of a communication network using the at least one antenna; and
   at least one processor coupled to the at least one radio, wherein the at least one processor is configured to perform operations comprising:
      receiving a New Radio (NR) Physical Random Access Channel (PRACH) configuration comprising an indication of a time-domain PRACH resource type to determine when the UE device is allowed to transmit a PRACH preamble and a type of preamble format; and
      determining a PRACH resource based on the received NR PRACH configuration to transmit the PRACH preamble, wherein the PRACH resource includes RACH resource occasions (ROs) with gaps in between;
   initiating a PRACH procedure by transmitting the PRACH preamble on a RO based on the determined PRACH resource to a base station (BS); and
   performing Listen-Before-Talk (LBT) operations during a gap before the RO to transmit the PRACH preamble prior to initiating the PRACH procedure.

20. The UE device of claim 19, wherein the operations further comprise:
   determining whether the PRACH resource include gaps or no gaps based on a global synchronization channel number (GSCN) value.

* * * * *